United States Patent
Kinoshita et al.

(10) Patent No.: US 10,481,633 B1
(45) Date of Patent: Nov. 19, 2019

(54) ELECTRONIC APPARATUS

(71) Applicant: LENOVO (SINGAPORE) PTE. LTD., Singapore (SG)

(72) Inventors: Hiroaki Kinoshita, Yokohama (JP);
Takehito Yamauchi, Yokohama (JP);
Fumitake Mizoguchi, Yokohama (JP);
Shigehiro Horiuchi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/101,089

(22) Filed: Aug. 10, 2018

(30) Foreign Application Priority Data

Jun. 1, 2018 (JP) .................................. 2018-106294

(51) Int. Cl.
*G06F 1/16* (2006.01)
*H04N 5/225* (2006.01)

(52) U.S. Cl.
CPC .......... *G06F 1/1605* (2013.01); *G06F 1/1637* (2013.01); *G06F 1/1686* (2013.01); *H04N 5/2254* (2013.01)

(58) Field of Classification Search
CPC .... G06F 1/1605; G06F 1/1637; G06F 1/1686; H04N 5/2254
See application file for complete search history.

(56) References Cited

U.S. PATENT DOCUMENTS

| | | | | |
|---|---|---|---|---|
| 4,522,478 A * | 6/1985 | Kando | ................... | G03B 17/04 396/448 |
| 4,864,338 A * | 9/1989 | Wakabayashi | ......... | G03B 17/12 396/349 |
| 5,406,413 A * | 4/1995 | Mogamiya | ............. | G03B 17/02 359/507 |
| 5,708,891 A * | 1/1998 | Ando | ..................... | G03B 17/04 396/349 |
| 5,819,127 A * | 10/1998 | Yokota | ................... | G03B 17/04 396/349 |
| 5,892,996 A * | 4/1999 | Yokota | ................... | G03B 17/04 396/349 |
| 6,305,852 B1 * | 10/2001 | Suzuki | ................... | G03B 17/04 396/349 |
| 2016/0001330 A1 * | 1/2016 | Romack | ................... | B08B 3/02 134/18 |

FOREIGN PATENT DOCUMENTS

JP 2016-021259 A 2/2016

* cited by examiner

*Primary Examiner* — David M Sinclair
*Assistant Examiner* — Theron S Milliser
(74) *Attorney, Agent, or Firm* — Shimokaji IP

(57) ABSTRACT

An electronic device includes a camera, a camera cover configured to be movable within a range at least including a closed position where the camera cover covers the camera and an open position where the camera cover does not cover the camera, a guide part which comes into contact with the camera cover and guides movement of the camera cover, and at least one dust collection part which is provided on a contact route along which the guide part comes into contact with the camera cover.

11 Claims, 4 Drawing Sheets

ELECTRONIC APPARATUS

FIELD OF THE INVENTION

The present invention relates to an electronic apparatus.

BACKGROUND OF THE INVENTION

Functional components such as a camera, a microphone and so forth are loaded on an electronic apparatus. In the electronic apparatus such as a Laptop PC disclosed, for example, in Japanese Unexamined Patent Application Publication No. 2016-21259, the camera is built in an upper part of a display. The built-in camera of the kind is convenient to be utilized as a Web camera for video chat. On the other hand, from the security viewpoint, there are cases where it is wished to physically cover or hide the camera. As an external accessary responding to such needs, camera covers with double-sided tape are on the market. For example, a certain camera cover is stuck to the upper part of the display and is configured to be slidable between a position where the camera cover covers the camera and a position where the camera cover does not cover the camera.

SUMMARY OF THE INVENTION

However, work of attaching such an existing camera cover to an electronic apparatus of a user is complicated and in addition it is feared that a pressure-sensitive adhesive of the tape would remain on the electronic apparatus when the camera cover is detached. In addition, when sliding of the camera cover is repeated, members rub against each other and thereby particles are generated. When the amount of the generated particles is increased, a sliding operation becomes heavy. In particular, in a case where the two members which are brought into contact with each other when sliding are made of different materials, such an issue becomes more remarkable.

The present invention aims to provide an electronic apparatus which is able to physically switch utilization of the functional component (the camera) without using the external accessary and moreover is able to suppress a reduction in switching operability for utilization of the functional component (the camera).

An electronic apparatus according to the first aspect of the present invention includes a camera, a camera cover configured to be movable within a range at least including a closed position where the camera cover covers the camera and an open position where the camera cover does not cover the camera, a guide part which comes into contact with the camera cover and guides movement of the camera cover and at least one dust collection part which is provided on a contact route along which the guide part comes into contact with the camera cover.

According to this aspect, for example, when the camera cover is moved from the open position to the closed position, the electronic apparatus is changed to a state where photographing by the camera is blocked. Then, on the other hand, when the camera cover is moved to the open position, the electronic apparatus is changed to a state where photographing by the camera is possible. Accordingly, it is possible to physically switch the utilization of the camera by the camera cover of the electronic apparatus and additional use of the external accessary for switching is eliminated.

In addition, it is possible to guide such movement of the camera cover by the guide part. At this time, since the guide part and the camera cover are in contact with each other, particles would be generated from the camera cover or the guide part in a case where movement of the camera cover is repeated. However, it is possible to collect these particles by the dust collection part provided on the contact route along which the camera cover comes into contact with the guide part. Thereby, since impairing of easiness of movement of the camera cover is suppressed, it is possible to ensure good switching operability for utilization of the camera longlastingly.

An electronic apparatus according to the second aspect of the present invention includes a functional component which acquires information from the outside of the electronic apparatus and provides information to the outside, a cover configured to be movable within a range at least including a closed position where the cover covers the functional component and an open position where the cover does not cover the functional component, a guide part which comes into contact with the cover and guides movement of the cover and at least one dust collection part which is provided on a contact route along which the guide part comes into contact with the cover.

Here, the camera, a microphone, an indicator, a loudspeaker, a fingerprint authenticator and so forth may be given as examples of the functional component.

According to the electronic apparatuses of the abovedescribed aspects of the present invention, it is possible to physically switch the utilization of the functional component (the camera) without using the external accessary and in addition it is possible to suppress a reduction in switching operability for the utilization of the camera.

DETAILED DESCRIPTION OF THE INVENTION

An example that an electronic apparatus according to a preferred embodiment of the present invention is applied to a Laptop PC will be described with reference to the appended drawings. In the respective drawings, elements to which the same numerals are assigned have the same or similar configurations.

Figure 1:
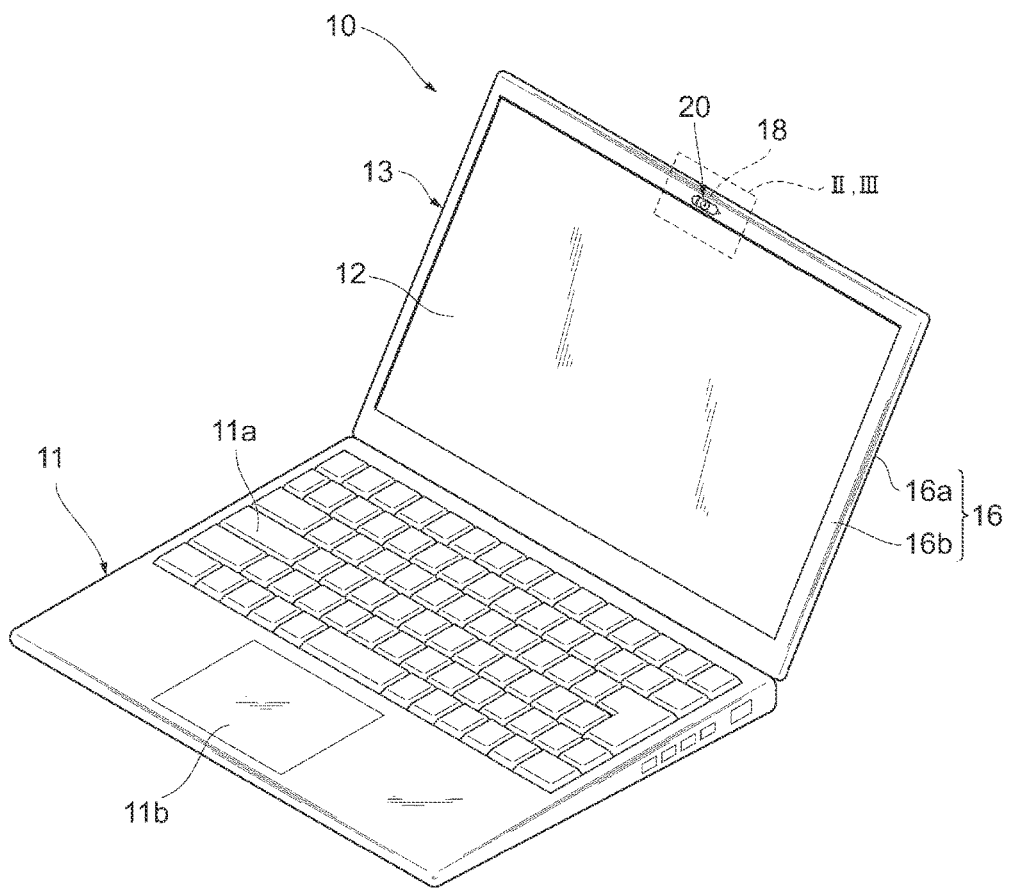
FIG. 1 is a perspective view illustrating one example of a configuration of an electronic apparatus according to one embodiment of the present invention.

As illustrated in FIG. 1, an electronic apparatus 10 has a main body 11 and a lid body 13. The main body 11 exhibits a flat box shape. Memories such as an HDD (Hard Disk Drive), an SSD (Solid State Drive) and so forth are housed in the main body 11 in addition to a substrate, a CPU (Central Processing Unit) and a battery illustration of which is omitted. Input devices configured to accept input from a user such as a keyboard 11a, a touch pad 11b and so forth are disposed on an upper face of the main body 11. The lid body 13 houses therein a display 12 which is a display panel. The lid body 13 is connected to an end of the main body 11 via hinges illustration of which is omitted and is configured to be openable/closable relative the main body 11. The lid body 13 covers the input devices such as the keyboard 11a and so forth in a closed state. In addition, the lid body 13 stands up as illustrated in FIG. 1 in an open state, makes the display 12 face the user and exposes the input devices such as the keyboard 11a and so forth. In the following, in a state where the lid body 13 stands up, a direction from the lid body 13 side toward the user side will be referred to as "front" and a left-right direction of the lid body 13 viewing from the user will be referred to as "a width direction".

The lid body 13 has a chassis 16 which is configured by a lid cover 16a and a bezel 16b and the lid cover 16a fixes the back-face side of the display 12. The bezel 16b is a frame body and exposes the display 12 through the inside of the frame of its own. That is, the bezel 16b is disposed to surround a front-side peripheral edge of the display 12. A camera 18 is housed in the chassis 16 on an almost width-direction central part of an upper part of the display 12. The camera 18 is a photograph device which has a lens and an image sensor illustration of which is omitted and takes light and generates image data. The camera 18 is used to take a picture of the user and is used by the user for the purpose of performing video chat with other persons. A camera cover 20 is disposed on the above-described almost central part of the bezel 16b so as to make it possible to physically hide the camera 18 by covering the camera 18.

Figure 2A:
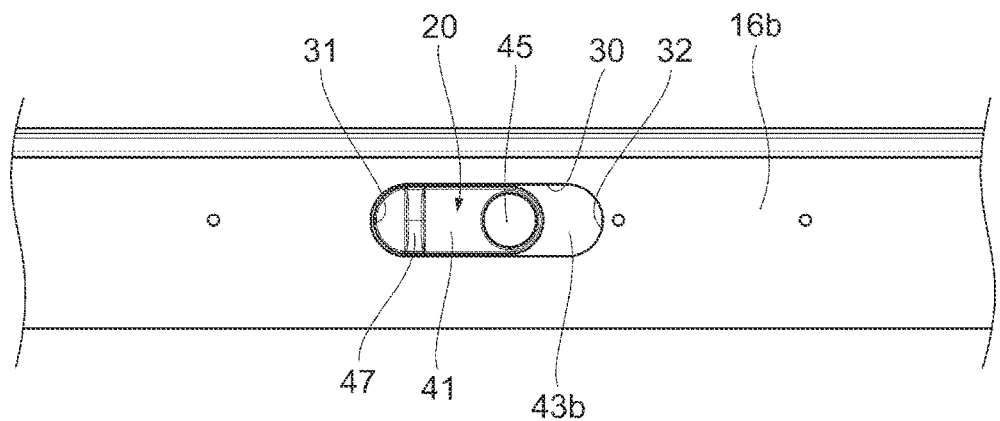
FIG. 2A is a front view illustrating examples of an upper part of a display when a camera cover of the electronic apparatus in FIG. 1 is at an open position.
Figure 2B:
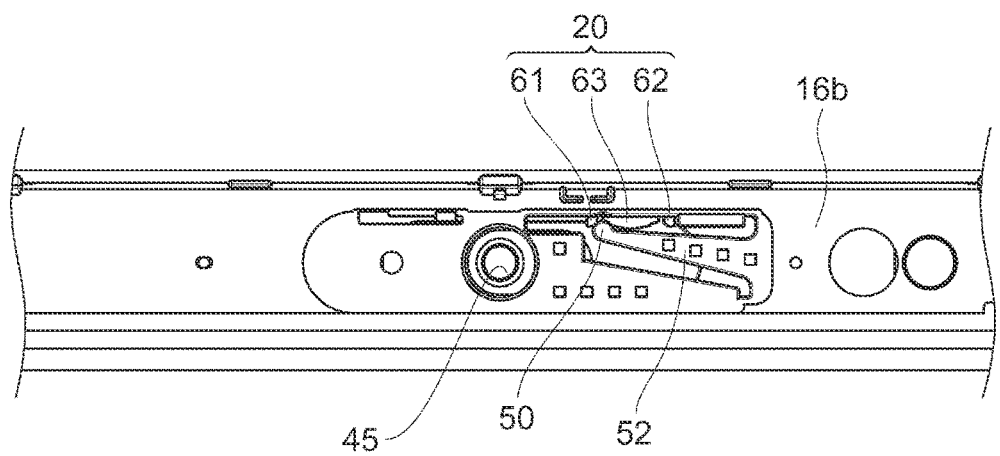
FIG. 2B is a back view illustrating examples of an upper part of a display when a camera cover of the electronic apparatus in FIG. 1 is at an open position.
Figure 3A:
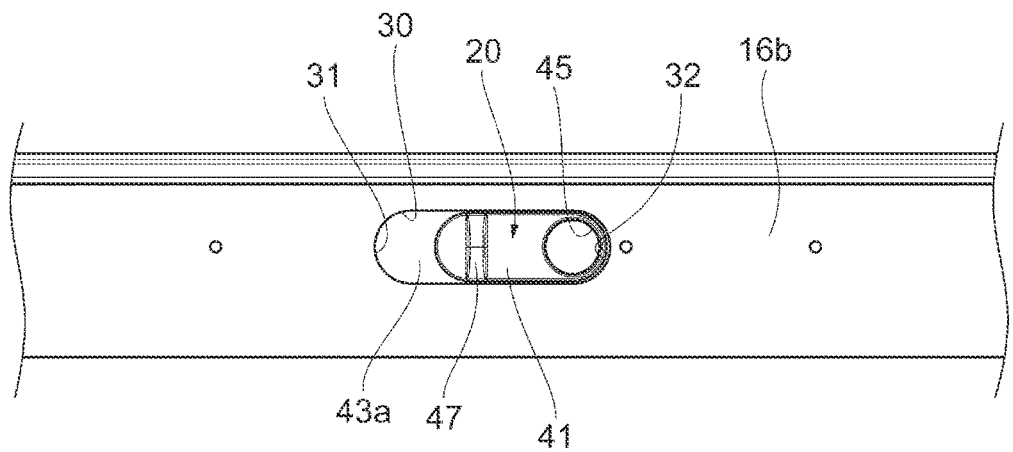
FIG. 3A is a front view illustrating examples of the upper part of the display when the camera cover of the electronic apparatus in FIG. 1 is at a closed position.
Figure 3B:
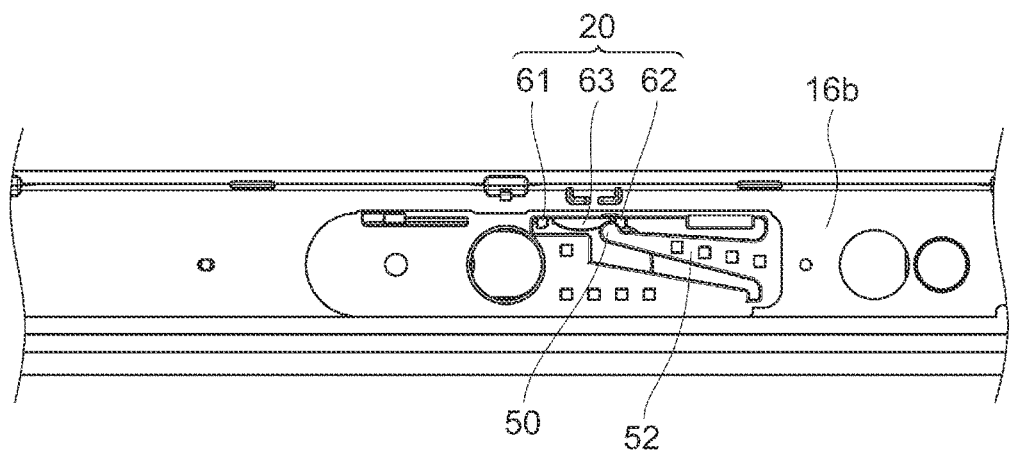
FIG. 3B is a back view illustrating examples of the upper part of the display when the camera cover of the electronic apparatus in FIG. 1 is at a closed position.

FIG. 2 and FIG. 3 are diagrams illustrating examples of a configuration around the camera cover 20 when the camera cover 20 is set at the open position and at the closed position respectively. Incidentally, FIG. 2B and FIG. 3B illustrate a state of viewing the bezel 16b from the rear with the lid cover 16a being removed from the lid body 13. The camera cover 20 is configured to be movable within a range at least including the open position in FIG. 2 where the camera cover 20 does not cover the camera 18 and the closed position in FIG. 3 where the camera cover 20 covers the camera 18. In the examples illustrated in FIG. 2 and FIG. 3, movement of the camera cover 20 is linear sliding movement in the width direction.

As illustrated in FIG. 2A and FIG. 3A, a slot 30 in which the camera cover 20 is to be disposed is formed in the bezel 16b. The slot 30 is disposed with its longitudinal direction being oriented in the width direction and both ends 31 and 32 of the slot 30 are formed into arc shapes. The slot 30 is formed through the bezel 16b in a thickness direction. The camera cover 20 is disposed in the slot 30 so as not to project forward beyond a front face of the bezel 16b and is configured to be slidingly movable in the width direction in the slot 30.

As illustrated in FIG. 2A and FIG. 3A, the camera cover 20 has a thick part 41 and thin parts 43a and 43b on its front-face side. The thick part 41 has an almost elliptical partial area which is located on a width-direction central part of the camera cover 20 and both ends of the thick part 41 exhibit arc shapes of radiuses which are almost equal to those of the both ends 31 and 32 of the slot 30 respectively. A lens hole 45 is formed through the thick part 41 on one side of the width direction and a groove 47 is formed in a front face of the thick part 41 on the other side of the width direction. The lens hole 45 is configured to be locatable on the front of the camera 18. That is, when the camera over 20 is set at the open position, part of the camera 18 is exposed through the lens hole 45. The groove 47 extends orthogo-nally to the width direction and is used as a finger hook when the user slidingly moves the camera cover 20 in the width direction.

The thin parts 43a and 43b have almost semicircular partial areas which extend from the above-described both ends of the thick part 41 in the width direction respectively. At the open position in FIG. 2, the thin part 43a is hidden behind the bezel 16b and the thin part 43b is exposed from the bezel 16b. At this time, since the lens hole 45 is located on the width-direction center of the slot 30 and the camera 18 is not covered with the camera cover 20, photographing by the camera 18 becomes possible. On the other hand, at the closed position in FIG. 3, the thin part 43a is exposed from the bezel 16b and the thin part 43b is hidden behind the bezel 16b. At this time, since a partial area of the thick part 41 between the lens hole 45 and the groove 47 is located on the width-direction center of the slot 30 and the camera 18 is covered with the camera cover 20, photographing by the camera 18 is physically blocked.

As illustrated in FIG. 2B and FIG. 3B, a guide part 50 which guides movement of the camera cover 20 is integrally provided on a leading end of a cantilever-supported arm 52. The guide part 50 comes into contact with the rear-face side of the camera cover 20. In addition, the guide part 50 is configured to engage with the camera cover 20 which is set at the open position in FIG. 2 thereby to restrict free movement of the camera cover 20 at the open position and to engage with the camera cover 20 which is set at the closed position in FIG. 3 thereby to restrict free movement of the camera cover 20 at the closed position.

Describing in detail, the camera cover 20 has a first engagement receiving section 61 which is brought into engagement with the guide part 50 at the open position, a second engagement receiving section 62 which is brought into engagement with the guide part 50 at the closed position and a transition section 63 which couples the first engagement receiving section 61 with the second engagement receiving section 62 on its rear-face side. On the camera cover 20, the first engagement receiving section 61, the transition section 63 and the second engagement receiving section 62 are arrayed in order along the width direction. The first engagement receiving section 61 and the second engagement receiving section 62 are both formed as recessed sections which are opened toward the guide part 50 side. For example, the first engagement receiving section 61 and the second engagement receiving section 62 are formed as the recessed sections configured by semi-arched inner faces. The transition section 63 projects toward the guide part 50 side beyond the first engagement receiving section 61 and the second engagement receiving section 62 and is formed into an arc shape having the center of curvature on the opposite side of the guide part 50. The transition section 63 exhibits a tendency that its central part projects the most toward the guide part 50 side and a projection amount is reduced from the central part toward the first engagement receiving section 61 and the second engagement receiving section 62.

The guide part 50 is formed into a shape which fits the shapes of the first engagement receiving section 61 and the second engagement receiving section 62. For example, the guide part 50 is formed into a semicircular shape so as to fit the shapes of the first engagement receiving section 61 and the second engagement receiving section 62 which are formed as the recessed sections configured by the semi-arched inner faces. In addition, the guide part 50 is formed integrally with the arm 52 and projects from the leading end of the arm 52 toward the first engagement receiving section 61, the transition section 63 and the second engagement receiving section 62. The arm 52 is disposed along and in parallel with the bezel 16b and a base end of the arm 52 is fixed to part of the bezel 16b. Thereby, the arm 52 is cantilever-supported with the guide part 50 being made as a free end. Then, the guide part 50 which is integrally provided on the leading end of the arm 52 is made to be urged toward the first engagement receiving section 61 and the second engagement receiving section 62 when engaging with the first engagement receiving section 61 and the second engagement receiving section 62 by utilizing spring property achieved by cantilever-supporting of the arm 52. Thereby, when no external force is added, disengagement of the guide part 50 from the first engagement receiving section 61 is restricted in a state where the guide part 50 is held in engagement with the first engagement receiving section 61. The same is true of the second engagement receiving section 62 in this point.

When the user adds predetermined external force in the width direction in this restricted state, the guide part 50 disengages from the first engagement receiving section 61 or the second engagement receiving section 62 and a region of the camera cover 20 with which the guide part 50 comes into contact is shifted from the first engagement receiving section 61 or the second engagement receiving section 62 to the transition section 63. As described above, since the transition section 63 is located closer to the guide part 50 side than the first engagement receiving section 61 and the second engagement receiving section 62, the transition section 63 receives urging force which is larger than the urging force exerted onto the first engagement receiving section 61 and the second engagement receiving section 62 from the guide part 50. When movement of the camera cover 20 in the width direction is continued while resisting this urging force, the region of the camera cover 20 with which the guide part 50 comes into contact is shifted from the transition section 63 to the second engagement receiving section 62 or the first engagement receiving section 61 and the guide part 50 comes to engage with the second or first engagement receiving section 62 or 61.

In the present embodiment, the camera cover 20 and the guide part 50 are made of mutually different materials. For example, the camera cover 20 and the guide part 50 are made of resins which are different from each other in mechanical characteristics (yield strength, tensile strength, bending strength and so forth). In a certain example, both of the camera cover 20 and the guide part 50 are formed by using materials with which in a case where sliding movement of the camera cover 20 is repeated, the guide part 50 is scraped off more positively than the camera cover 20 due to contact of the camera cover 20 with the guide part 50 and thereby particles are generated. Such generation of the particles would occur even in a case of using the same material. In order to cope with the particles so generated, the electronic apparatus 10 of the present embodiment has a dust collection part. Incidentally, the materials of the camera cover 20 and the guide part 50 are also different from the material of the bezel 16b. For example, materials which are more excellent in slidability than the material of the bezel 16b are used for the camera cover 20 and the guide part 50.

Figure 4:
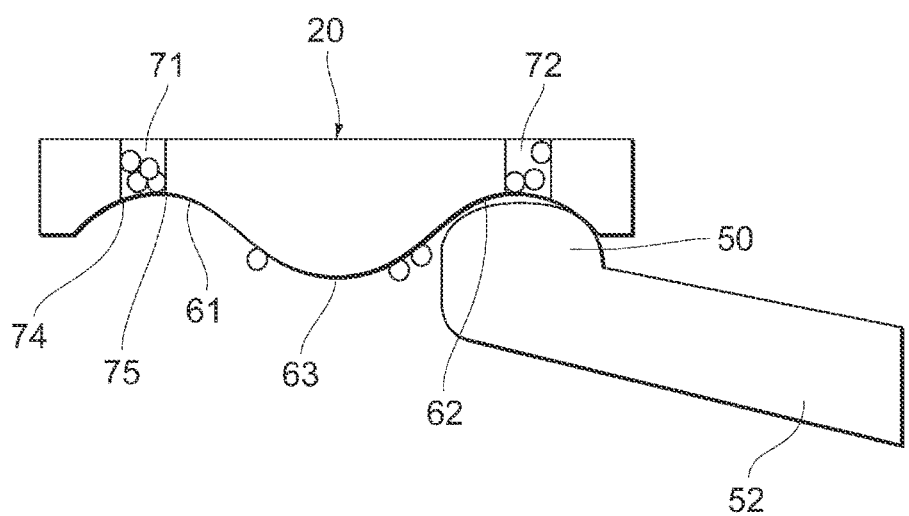
FIG. 4 is a schematic enlarged diagram of FIG. 3B.

As illustrated in FIG. 4, a first dust collection part 71 is formed in the first engagement receiving section 61 and a second dust collection part 72 is formed in the second engagement receiving section 62. For example, the first dust collection part 71 is in the form of a through-hole which is formed in the bottom of the first engagement receiving section 61 which is formed as the recessed section. It is preferable that the first dust collection part 71 be positioned on a central part of the bottom concerned. This is because when the guide part 50 moves to the first engagement receiving section 61, it becomes easy to drop the above-described particles as dust into the first dust collection part 71 and it becomes also easy to suppress looseness of the guide part 50 relative to the first engagement receiving section 61 by positioning the first dust collection part 71 in this way.

Although it is possible to appropriately design a width and a depth of the first dust collection part 71, for example, it is possible to set the width of the first dust collection part 71 to ½ or ⅓ of the width of the first engagement receiving section 61. In addition, it is also possible to form the first dust collection part 71 as a bottomed hole in place of the through-hole. In the first dust collection part 71 which is formed as the through-hole or the bottomed hole, it is preferable that opening wedges 74 and 75 on the both sides in the width direction be R-chamfered. This is because it becomes possible to suppress catching of the guide part 50 in the opening edges 74 and 75 of the first dust collection part 71 by R-chamfering the opening edges 74 and 75 in this way. Incidentally, it is possible to apply a configuration which is similar to the configuration of the first dust collection part 71 also to the second dust collection part 72 and detailed description thereof is omitted.

Here, although in the present embodiment, the two dust collection parts (the first dust collection part 71 and the second dust collection part 72) are disposed, it is also possible to decrease the number of the dust collection parts to one and to increase the number to three or more. For example, it is also possible to form the dust collection part in the transition section 63. However, in a case where importance is attached to a viewpoint of goodness of feeling of sliding movement of the camera cover 20 that the user feels, it is preferable that the dust collection part be not be formed in the transition section 63. In any case, the position where the dust collection part is provided is set on a contact route along which the guide part 50 comes into contact with the camera cover 20. In the above-described example, the contact route is a route along which the first engagement receiving section 61, the transition section 63 and the second engagement receiving section 62 are formed in succession and the dust collection parts (the first dust collection part 71 and the second dust collection part 72) are formed in the first engagement receiving section 61 which is a start point of the contact route and in the second engagement receiving section 62 which is an end point of the contact route respectively.

As described above, the electronic apparatus 10 according to the present embodiment includes the camera 18, the camera cover 20 configured to be movable within the range including at least the closed position where the camera cover 20 covers the camera 18 and the open position where the camera cover 20 does not cover the camera 18, the guide part 50 which comes into contact with the camera cover 20 and guides the movement of the camera cover 20 and at least one dust collection part (71, 72) which is provided on the contact route along which the guide part 50 comes into contact with the camera cover 20. Thereby, when the camera cover 20 is moved to the closed position, the state where photographing by the camera 18 is blocked is established. On the other hand, when the camera cover 20 is moved to the open position, the state where photographing by the camera 18 becomes possible is established. Accordingly, since it is possible to physically switch utilization of the camera 18 by using the camera cover 20 that the electronic apparatus 10 itself includes, it is not necessary to additionally use the external accessary for covering the camera 18. In addition, it is possible to guide the movement of the camera cover 20 by the guide part 50 and even when the particles are generated from the camera cover 20 or the guide part 50 in association with this guide, it is possible to collect the particles by the dust collection part (71, 72). Thereby, since impairing of easiness of movement of the camera cover 20 is suppressed, it is possible to ensure good switching operability for utilization of the camera long-lastingly.

In addition, the guide part 50 engages with the camera cover 20 which is set at the closed position to restrict free movement of the camera cover 20 and engages with the camera cover 20 which is set at the open position to restrict the free movement of the camera cover 20. Thereby, since the camera cover 20 which is set at the closed position or the open position keeps staying at the closed position and the open position in a free state, it is possible to suppress arbitrary or spontaneous switching of the utilization of the camera 18.

In addition, the camera cover 20 has the first engagement receiving section 61 and the second engagement receiving section 62 because of a relation between the open position and the closed position and the first dust collection part 71 and the second dust collection part 72 are formed in the first engagement receiving section 61 and the second engagement receiving section 62 respectively. Thereby, it is possible to collect the above-described particles at the open position and the closed position. It becomes possible to collect the above-described particles into the first dust collection part 71 and the second dust collection part 72 by an operation performed, for example, when the guide part 50 engages with the first engagement receiving section 61 or the second engagement receiving section 62.

In addition, the camera cover 20 has the transition section 63 which projects toward the guide part 50 side beyond the first engagement receiving section 61 and the second engagement receiving section 62 and the guide part 50 is integrally provided on the leading end of the cantilever-supported arm 52. Thereby, it becomes possible to urge the guide part 50 which engages with the first engagement receiving section 61 or the second engagement receiving section 62 toward a direction that engagement force of the guide part 50 is increased by utilizing the spring property of the arm 52. Accordingly, it is possible to suppress free disengagement of the guide part 50 from the first engagement receiving section 61 or the second engagement receiving section 62. In addition, when the camera cover 20 is moved by the user, the user receives large urging force (spring force of the arm 52) via the transition section 63. On the other hand, when the region of the camera cover 20 with which the guide part 50 comes into contact is shifted from the transition section 63 to the first engagement receiving section 61 or the second engagement receiving section 62, the user feels that the urging force concerned is reduced. For this reason, it becomes possible to make the user feel goodness of feeling that the position of the camera cover 20 is switched to the open position or the closed position.

The above-described embodiment is made for easy understanding of the present invention and not for limited interpretation of the present invention. Respective elements that the embodiment includes and arrangement, materials, conditions, shapes, sizes and so forth of the elements are not limited to exemplified ones and may be appropriately modified and altered.

For example, the movement of the camera cover 20 is not limited to the linear sliding movement and may be rotational movement. By way of example, it is also possible to move the camera cover 20 between the open position and the closed position by pivotally supporting one end of the camera cover 20 and rotating the camera cover 20 90 degrees around this one end. However, when a space for installation of the camera cover 20 and the switching operability for utilization of the camera 18 are taken into consideration, it is preferable that the movement of the camera cover 20 be the sliding movement.

In addition, it is also possible to form the dust collection part(s) (71, 72) not in the camera cover 20 but in the guide part 50 and it is also possible to form the dust collection parts (71, 72) in both of the camera cover 20 and the guide part 50. Even in a case where the dust collection part(s) (71, 72) is/are formed in the guide part 50, the position where the dust collection part(s) (71, 72) is/are formed is set on the contact route along which the guide part 50 comes into contact with the camera cover 20.

The electronic apparatus 10 may be electronic apparatuses such as a mobile phone, a smartphone, an electronic organizer and so forth in addition to various PCs such as a desktop PC, a tablet-type PC, a so-called compatible tablet-type PC and so forth, not limited to the Laptop PC.

In addition, a configuration which is the same as or similar to the above configuration may be adopted also for functional components other than the camera 18 and the functional components may be physically covered and hidden. The functional components may be components which acquire information from the outside of the electronic apparatus 10 and/or provide information to the outside. As the functional components other than the camera 18, for example, a microphone, an indicator, a loudspeaker, a fingerprint authenticator and so forth may be given. It becomes possible to physically block, for example, the microphone by using a cover of the configuration which is the same as or similar to the above-described configuration of the camera cover 20.

The invention claimed is:

1. An electronic apparatus comprising:
   a camera;
   a camera cover configured to be movable between a closed position where the camera cover covers the camera and an open position where the camera cover does not cover the camera;
   the camera cover has a first engagement receiving section which engages the guide part at the open position and a second engagement receiving section which engages the guide part at the closed position, and a transition section between and coupled to the first and second engagement receiving sections;
   the transition section is convex, the first engagement receiving section is concave, and the second engagement receiving section is concave;
   a guide part configured to contact the camera cover and guide movement of the camera cover; and
   at least one dust collection part on a contact route along which the guide part contacts the camera cover.

2. The electronic apparatus according to claim 1, wherein:
   the guide part engages the camera cover at the closed position to restrict free movement of the camera cover and engages the cameral cover at the open position to restrict the free movement of the camera cover.

3. The electronic apparatus according to claim 2, wherein:
   the at least one dust collection part has a first dust collection part in the first engagement receiving section and a second dust collection part in the second engagement receiving section.

4. The electronic apparatus according to claim 3, wherein:
at least one of the first dust collection part and the second dust collection part is a through-hole or a bottomed hole in a corresponding engagement receiving section.

5. The electronic apparatus according to claim 3, wherein:
the transition section projects towards the guide part side beyond the first engagement receiving section and the second engagement receiving section and
the guide part is integrally provided on a leading end of a cantilever-supported arm.

6. The electronic apparatus according to claim 5, wherein:
the transition section is arc shaped and has a center of curvature on an opposite side of the guide part.

7. The electronic apparatus according to claim 5, wherein:
the at least one dust collection part is outside of the transition section.

8. The electronic apparatus according to claim 1, wherein:
the at least one dust collection part is formed in one of the camera cover and the guide part.

9. The electronic apparatus according to claim 1, wherein:
the camera cover is configured to be slidingly movable.

10. The electronic apparatus according to claim 1, wherein:
the camera cover and the guide part are made of different materials.

11. An electronic apparatus, comprising:
a functional component which acquires information from outside of the electronic apparatus and provides information to the outside;
a cover configured to be movable between a closed position where the cover covers the functional component and an open position where the cover does not cover the functional component;
the camera cover has a first engagement receiving section which engages the guide part at the open position and a second engagement receiving section which engages the guide part at the closed position, and a transition section between and coupled to the first and second engagement receiving sections;
the transition section is concave, the first engagement receiving section is convex, and the second engagement receiving section is convex;
a guide part configured to contact the cover and guide movement of the cover; and
at least one dust collection part on a contact route along which the guide part contacts the cover.

* * * * *